US009269035B2

(12) United States Patent
Redd

(10) Patent No.: US 9,269,035 B2
(45) Date of Patent: Feb. 23, 2016

(54) MODIFIED TWO-DIMENSIONAL CODES, AND LASER SYSTEMS AND METHODS FOR PRODUCING SUCH CODES

(71) Applicant: ELECTRO SCIENTIFIC INDUSTRIES, INC., Portland, OR (US)

(72) Inventor: Justin D. Redd, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days.

(21) Appl. No.: 14/194,455

(22) Filed: Feb. 28, 2014

(65) Prior Publication Data

US 2015/0248602 A1 Sep. 3, 2015

(51) Int. Cl.
*G06K 19/06* (2006.01)
*G06K 1/12* (2006.01)
*B41J 2/44* (2006.01)
*B41J 3/01* (2006.01)

(52) U.S. Cl.
CPC ............ *G06K 19/06037* (2013.01); *B41J 2/442* (2013.01); *B41J 3/01* (2013.01); *G06K 1/121* (2013.01)

(58) Field of Classification Search
CPC .............. G06K 19/06037; G06K 7/14; G06K 7/10851; G06K 7/1443; G06K 7/1417; G06K 7/1008; B42D 15/10
USPC .................. 235/494, 487, 454, 462.09, 462.1
IPC ........... G06K 19/06037, 7/14, 7/10851, 7/1443, G06K 7/1417; G07F 7/1008; B42D 15/10
See application file for complete search history.

(56) References Cited

U.S. PATENT DOCUMENTS

| 5,726,435 | A | 3/1998 | Hara et al. |
| 5,737,122 | A | 4/1998 | Wilt et al. |
| 5,751,585 | A | 5/1998 | Cutler et al. |
| 5,767,483 | A | 6/1998 | Cameron et al. |
| 5,894,530 | A | 4/1999 | Wilt |
| 6,433,301 | B1 | 8/2002 | Dunsky et al. |
| 6,706,999 | B1 | 3/2004 | Barrett et al. |
| 7,019,891 | B2 | 3/2006 | Johnson |
| 7,589,869 | B2 | 9/2009 | Johansen et al. |
| 8,322,621 | B2 | 12/2012 | Olmstead |
| 8,379,679 | B2 | 2/2013 | Zhang et al. |
| 8,608,077 | B2 | 12/2013 | Olmstead |
| 8,678,287 | B2 | 3/2014 | Olmstead |

(Continued)

FOREIGN PATENT DOCUMENTS

| WO | WO2011047325 A1 | 4/2011 |
| WO | WO2012-035552 A2 | 3/2012 |
| WO | WO2013018980 A1 | 2/2013 |

OTHER PUBLICATIONS http://en.wikipedia.org/wiki/QR code, 14 pages.

(Continued)

*Primary Examiner* — Karl D Frech

(57) ABSTRACT

Each black square within a two-dimensional code can be represented by a distribution of spots. Each spot can be made small enough to be invisible to the human eye so that the two-dimensional code can be invisible on or within transparent or nontransparent materials. The spots can be spaced at a large distance to increase the signal-to-noise ratio for an optical code reader. A laser can be used to produce the spots.

36 Claims, 6 Drawing Sheets

(56) References Cited

U.S. PATENT DOCUMENTS

| | | | |
|---|---|---|---|
| 2004/0000490 | A1 | 1/2004 | Chang et al. |
| 2004/0046024 | A1 | 3/2004 | Natsukari et al. |
| 2006/0213994 | A1 | 9/2006 | Faiz et al. |
| 2007/0038464 | A1 | 2/2007 | Sato et al. |
| 2008/0017619 | A1 | 1/2008 | Yamakawa et al. |
| 2010/0213255 | A1 | 8/2010 | Yoo |
| 2011/0259962 | A1 | 10/2011 | Picard et al. |
| 2012/0211566 | A1 | 8/2012 | Hensel et al. |
| 2012/0327214 | A1* | 12/2012 | McEntyre ............... 348/86 |
| 2013/0208074 | A1 | 8/2013 | Zhang et al. |
| 2013/0320276 | A1 | 12/2013 | Farrell |
| 2013/0341400 | A1 | 12/2013 | Lancaster-Larocque |

OTHER PUBLICATIONS http://en.wikipedia.org/wiki/Data Matrix, 13 pages.
http://www.totalbrandsecurity.com/?page id=209#&panell-1, 1 page.
GS1_General Specifications, Jan. 14, 2014, 478 pages.
NAGINELS Total Brand Security, 3 pages.
Machine translation (Google patents) of WO2013018980 of Byung Ho Park, dated Feb. 7, 2013.
QR Code—Wikipedia (https://en.wikipedia.org/wiki/QR_code), 14 pages, available before Feb. 28, 2014.
Data Matrix—Wilipedia (https://en.wikipedia.org/wiki/Data_Matrix),13 pages, available before Feb. 28, 2014.
TBS Total Brand Security (http://totalbrandsecurity.com/?page id=209#&panell-1), 1 page, available before Feb. 28, 2014.
PCT/US2015/017359 International Search Report, Issued May 28, 2015 2 page.
PCT/US2015/017359 Written Opinion, 9 pages.
European Search Report, dated Oct. 8, 2015, concerning EP Pat. Application No. 11860642 (which corresponds with U.S. Appl. No. 12/871,588), 6 pages.

* cited by examiner

MODIFIED TWO-DIMENSIONAL CODES, AND LASER SYSTEMS AND METHODS FOR PRODUCING SUCH CODES

COPYRIGHT NOTICE

© 2014 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

TECHNICAL FIELD

This application relates to two-dimensional codes and, in particular, to laser systems and methods for producing such codes.

BACKGROUND

Two-dimensional identification (2DID) codes, such as QR codes and Data Matrix codes, are types of a matrix barcode that is widely used for product tracking and providing a variety of information. QR codes include filled darkened squares (black squares) arranged within a square grid on a light background and are suitable for high-speed acquisition by an imaging device, such as a camera. Typical square grid patterns range from 11 to 177 squares per row or column. Patterns in the horizontal and the vertical components of the acquired image can reveal or activate the coded information, such as for commercial tracking, entertainment and transport ticketing, product labeling, product marketing, mobile phone tagging, couponing, displaying text, adding vCard contact information, opening an URL or URI, or composing email or text messages. The QR code is covered by an ISO standard, and its use is license free. QR code generating websites and apps are widely available so users can generate and print their own QR codes for others to scan. (See http://en.wikipedia.org/wiki/QR_code.) An exemplary QR code is shown in FIG. 1.

Data Matrix codes are also covered by several ISO and IEC standards and are license free for many applications. See http://en.wikipedia.org/wiki/Data_Matrix. Data Matrix code-generating resources are also widely available. An exemplary Data Matrix code generated using http://datamatrix.kaywa.com is shown in FIG. 2.

Methods exist for marking these 2DID codes on various materials and in many different sizes. For example, some 2DID codes can be printed on labels using traditional print technology, engraved into metal, and carved into tombstones.

SUMMARY OF DISCLOSURE

This summary is provided to introduce a selection of concepts in a simplified form that are further described in the detailed description of the invention. This summary is not intended to identify key or essential inventive concepts of the claimed subject matter, nor is it intended for determining the scope of the claimed subject matter.

In some embodiments, a two-dimensional code is represented by a distribution of spots on or within a substrate having a contrasting background, wherein the distribution of spots comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots.

In some alternative, additional, or cumulative embodiments, a method for marking a substrate with a two-dimensional identification code, comprises generating laser pulses, and directing the laser pulses at the substrate to form a distribution of spots on or within the substrate, wherein the distribution of spots represents the two-dimensional code and comprises multiple groups of spots, including first and second groups of spots, wherein each of the first and second groups of spots is representative of a geometric shape, such that the distribution of spots forms an array of multiple rows and columns of geometric areas, wherein some of the geometric areas include one group of spots and some of the geometric areas are devoid of spots.

In some alternative, additional, or cumulative embodiments, a laser micromachining system for marking a substrate with a two-dimensional identification code on or within a substrate of a workpiece, wherein the two-dimensional code includes an array of geometrically-shaped areas, wherein some the geometrically-shaped areas are designated and some of the geometrically-shaped areas are undesignated, the laser micromachining system comprises: a laser for generating laser pulses along a beam axis; a workpiece support system for moving the workpiece; a beam-positioning system for directing the beam axis toward the workpiece, such that a laser pulse is operable to mark a spot on the substrate; and a controller for coordinating relative movement of the workpiece support system and the beam-positioning system, and for implementing conversion of designated geometrically-shaped areas of the two-dimensional code into respective locations on the substrate for spots of the groups representative of the designated geometrically-shaped areas.

In some alternative, additional, or cumulative embodiments, the representative geometric shape is a rectangular geometric shape, and the first and second groups of spots are positioned to represent corners of the rectangular geometric shape.

In some alternative, additional, or cumulative embodiments, the first and second groups of spots each contain an even number of spots.

In some alternative, additional, or cumulative embodiments, the first and second groups of spots each contain an odd number of spots.

In some alternative, additional, or cumulative embodiments, the distribution of spots representing the two-dimensional code is invisible to a human eye at a distance of greater than or equal to 25 mm from the human eye.

In some alternative, additional, or cumulative embodiments, the array has an array dimension that is larger than 50 microns.

In some alternative, additional, or cumulative embodiments, the array has an array dimension that is larger than 500 microns.

In some alternative, additional, or cumulative embodiments, the array has an array dimension that is smaller than or equal to 1 mm.

In some alternative, additional, or cumulative embodiments, the groups of spots are invisible to the human eye at a distance of greater than or equal to 25 mm from the human eye.

In some alternative, additional, or cumulative embodiments, each spot is invisible to the human eye at a distance of greater than or equal to 25 mm from the human eye.

In some alternative, additional, or cumulative embodiments, each spot has a dimension for a major spatial axis that is smaller than 35 microns.

In some alternative, additional, or cumulative embodiments, each spot has a spot dimension for a major spatial axis, and wherein a distance that is greater than or equal to four times the spot dimension of the major spatial axis separates the spots.

In some alternative, additional, or cumulative embodiments, the geometric areas represent squares in a QR code.

In some alternative, additional, or cumulative embodiments, the geometric areas represent squares in a Data Matrix code.

In some alternative, additional, or cumulative embodiments, each spot is formed by a laser pulse.

In some alternative, additional, or cumulative embodiments, each spot is formed by a laser pulse having a pulsewidth that is shorter than or equal to 50 ps.

In some alternative, additional, or cumulative embodiments, the spots are dark and the substrate is light.

In some alternative, additional, or cumulative embodiments, the spots make light marks and the substrate is dark.

In some alternative, additional, or cumulative embodiments, the spots are dark, and wherein the substrate is substantially transparent to visible light.

In some alternative, additional, or cumulative embodiments, the substrate is opaque to visible light.

In some alternative, additional, or cumulative embodiments, the substrate comprises sapphire.

In some alternative, additional, or cumulative embodiments, the substrate comprises glass.

In some alternative, additional, or cumulative embodiments, the substrate comprises a plastic.

In some alternative, additional, or cumulative embodiments, the substrate comprises aluminum.

In some alternative, additional, or cumulative embodiments, the laser pulses are directed to sequentially form a first group of spots before forming a second group of spots.

In some alternative, additional, or cumulative embodiments, the laser pulses are directed to form a first spot in each of first and second groups before forming a second spot in the first group.

In some alternative, additional, or cumulative embodiments, a beam-positioning system and a workpiece support system cooperate to position the spots of the laser pulses with respect to locations on the substrate, and wherein positioning accuracy of the spots to location is worse than 10 microns.

In some alternative, additional, or cumulative embodiments, wherein a beam-positioning system and a substrate support system cooperate to position the spots of the laser pulses with respect to locations on the substrate, and wherein positioning accuracy of the spots to location is worse than 5 microns.

In some alternative, additional, or cumulative embodiments, the group of spots provides a signal-to-noise ratio of greater than or equal to 5.

In some alternative, additional, or cumulative embodiments, the pitch or external separation between groups of spots can represent the signal amplitude, and the uncertainty or maximum inaccuracy of the coordinated beam positioning and workpiece support systems can represent the noise.

In some alternative, additional, or cumulative embodiments, the signal-to-noise ratio can be increased by increasing the pitch or external separation between the groups of spots.

In some alternative, additional, or cumulative embodiments, a controller is employed to convert black squares of the two-dimensional code into respective locations on the substrate for the groups of spots.

In some alternative, additional, or cumulative embodiments, a controller is employed to convert black squares of the two-dimensional code into respective locations on the substrate for the groups of spots.

In some alternative, additional, or cumulative embodiments, the array comprises at least 50 geometric areas in a row or a column.

In some alternative, additional, or cumulative embodiments, the two-dimensional identification code is intended to be machine-readable.

Additional aspects and advantages will be apparent from the following detailed description of preferred embodiments, which proceeds with reference to the accompanying drawings.

DETAILED DESCRIPTION OF EXEMPLARY EMBODIMENTS

Figure 1:
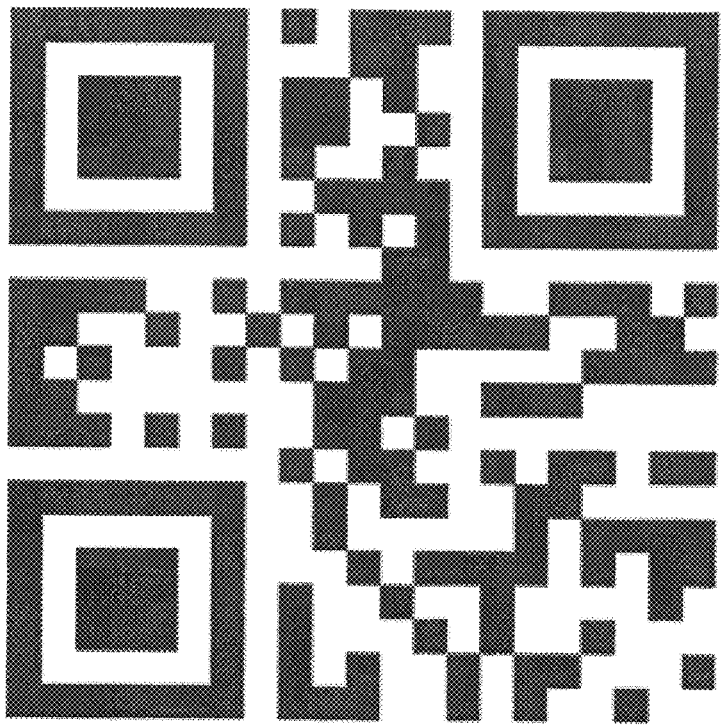
FIG. 1 is an example of a conventional QR code.

Example embodiments are described below with reference to the accompanying drawings. Many different forms and embodiments are possible without deviating from the spirit and teachings of this disclosure and so this disclosure should not be construed as limited to the example embodiments set forth herein. Rather, these example embodiments are provided so that this disclosure will be thorough and complete, and will convey the scope of the disclosure to those skilled in the art. In the drawings, the sizes and relative sizes of components may be exaggerated for clarity. The terminology used herein is for the purpose of describing particular example embodiments only and is not intended to be limiting. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween.

Some 2DID codes have been marked inside glass, such as by using TRACKinside® technology (see http://www.totalbrandsecurity.com/?page_id=209#&panel1-1). A number of laser micromachining systems manufactured by Electro Scientific Industries, Inc. of Portland, Oreg., such as models MM5330 and MM5900, equipped with appropriate lasers operated at various parameter combinations are also suitable for making 2DID codes on or within a variety of materials, such as ceramics, glasses, metals, or combinations thereof.

As marking on smaller parts has become desirable, the sizes of the 2DID codes have become smaller. Moreover, the availability of "invisible" 2DID codes would be useful for some applications, such as for transparent materials that serve as screens through which unobstructed views are desirable, or such as for proprietary information or secretive manufacturer labeling that could be used for a variety of purposes such as to detect authentic products versus counterfeit products.

One method for making a 2DID code invisible is to shrink the size of the code until the whole array of black squares is too small to see with the human eye. The theoretical maximum angular resolution of the human eye is 1.2 arc minutes, corresponding to a spot size of d=0.35 mm (350 microns) at a distance of 1.0 meter and d=0.7 mm at a distance of 2.0 meters. For convenience, this maximum angular resolution can be expressed as: $d \leq 0.35x$ mm, where d is the spot size in millimeters and x is the distance from the eye to the spot in meters.

However, at closer distances, such as a typical distance for reading a mobile phone screen (about 25 cm), the 2DID code would have to be smaller to be invisible (about 87.5 microns), and the individual squares would have to be even smaller. Even though a laser could be employed to make the individual squares adequately small, the black squares would most likely be sized to equal the spot size a single laser pulse. For example, a conventionally small laser spot size such as about 5 microns would limit such an invisible 2DID code to include at most 17 squares in a row or column. The practical limit of smallness of laser spot size is generally accepted to be about two times the wavelength of the laser employed, so spot sizes less than about 1 or 2 microns can be difficult and expensive to employ. Accordingly, there are significant cost and technological limits to more significant 2DID code shrinkage.

Figure 3:
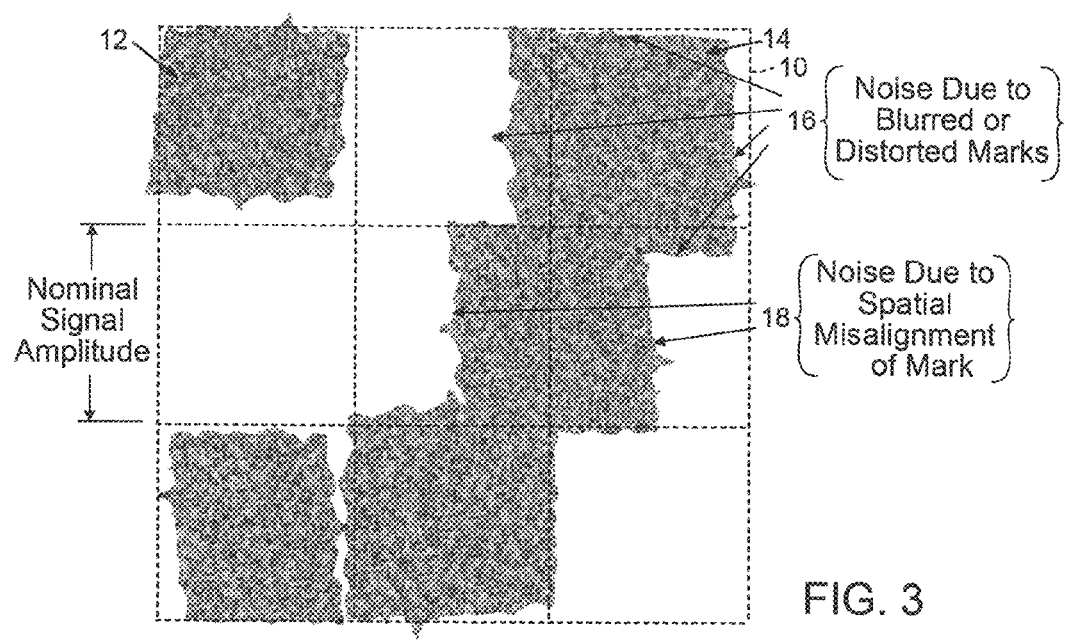
FIG. 3 shows laser-made small "black squares" of a portion of a 2DID code superimposed on a square grid.

FIG. 3 shows simulated laser-made "black squares" of a portion of a 2DID code superimposed on a square grid pattern 10. Actual lasers and materials may cause laser marking in blurred, distorted shapes, that are not properly aligned and that are not completely black, but rather shades of grey. All of these factors (blurring, shape distortion, misalignment, and low-contrast shading) result in less certainty regarding whether a particular square should be classified as "black" or "white." Some of these factors may result from unpredictable laser cavity effects, transient or chronic misalignment of optical components, or transient or chronic incoordination of beam positioning components and laser timing. These uncertainties are collectively referred to as the "noise."

These laser-made black squares and the grid pattern shown in FIG. 3 reveal how these issues may increase the noise with shrinkage of a 2DID code. In particular, FIG. 3 shows a shrunken mark 12, an enlarged mark 14, and non-uniform edges 16 caused by system noise. FIG. 3 also shows a misaligned mark 18 that may be caused by position inaccuracies or coordination inaccuracies in beam positioning or substrate positioning systems or timing inaccuracies with these systems and laser pulse generation. These distorted marks, particularly marks 14 and 18, may create difficulty for optical code readers to interpret even with the most sophisticated optics and error correction software.

The signal-to-noise ratio (SNR) of the marked 2DID code determines the likelihood of whether the code will be sufficiently undistorted to minimize errors in reading the 2DID code. The size of the individual squares in the 2DID code is proportional to the signal strength while distortion of the shape and size of the individual squares is proportional to the noise. Moreover, the signal amplitude can be determined by the spatial separation between patterns of spots representing each square and the noise amplitude can be determined by the accuracy of the system used to mark the spots. Therefore, as the size of the individual squares gets smaller, the signal strength is lower and the code is more susceptible to distortions, such as blurring or line distortion, that may occur in less-than-perfect marking machines.

Nevertheless, Electro Scientific Industries, Inc. of Portland, Oreg. made a laser micromachining system to successfully overcome many of these issues by precisely controlling alignment, timing, and coordination of the system components and by limiting the processing window of the laser system parameters to precisely deliver laser spots smaller than 10 microns to desired locations on a workpiece. In one particular embodiment, a microscopic 2DID code of a 126 by 126 micron-array of squares was made, wherein each designated black square was represented by a 4-5 micron-spot. However, the laser micromachining system used to make this 2DID code was very large and employed very expensive components.

To reduce system cost for producing invisible 2DID codes with a laser, applicant pursued a completely different paradigm. Rather than contend with the costs and problems associated with shrinking an entire 2DID code to be small enough to be invisible to the human eye, applicant determined that the 2DID code can be represented by a modified 2DID code that includes a group of spots that are invisible to the human eye for each black square of the 2DID code.

Figure 4:
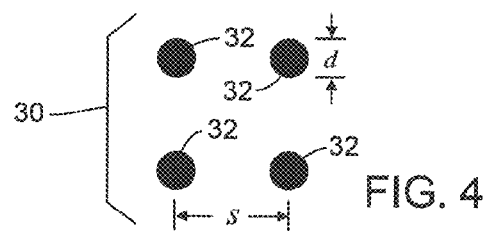
FIG. 4 is an enlarged representation of an exemplary pattern of laser spots used to replace a filled darkened square of a 2DID code.

FIG. 4 is an enlarged presentation of an exemplary pattern or group 30 of laser marks or spots 32 used to replace a filled darkened square of a conventional 2DID code. As noted earlier, the maximum angular resolution of the human eye can be expressed for convenience, as $d \leq 0.35x$ mm, where d is a major axis of the laser spot in millimeters and x is the distance from the eye to the spot in meters. So, for a typical minimum reading distance of about 125 cm, each spot in the 2DID code would have to have a major axis with a spot dimension that is shorter than or equal to about 44 microns to be invisible to the human eye (yet visible when magnified, such as under microscopic viewing).

During experimentation with grouping patterns, applicant noted that when invisibly small spots 32 are grouped closely together, they may appear as a single spot of a larger size, thus causing the group 30 of spots 32 to become visible. Empirical data based on experimentation demonstrated, however, that circularly shaped spots 32 with a diameter d appear as individual spots (as opposed to a conglomeration of spots appearing as a single spot) when the center-to-center separation of the spots 32, s, is greater than four times the diameter (i.e., $s \geq 4d$), as shown in FIG. 4.

Simple software can be used to convert a conventional 2DID code into a modified form, wherein each black square is represented by a pattern of small spots 32, wherein each individual spot 32 is selected to have a major spatial axis d that is small enough to be invisible to the human eye and the center-to-center spacing or distance between any two spots 32 is greater than four times the largest cross sectional dimension (e.g., the major spatial axis d) of the individual spots 32. Thus, the shape of each spot 32, as well as the size of the spot 32, can be selected. Circular spots 32 are typically easiest to produce, but square or elliptical spots 32, for example can also be employed. Similarly, the spatial energy profile of the spot 32 need not be uniform.

In general, the major spatial axis d of each spot 32 is between about 0.5 micron and about 90 microns. (A major spatial axis d smaller than about 87.5 microns is invisible to the human eye at a distance of 25 cm.) In some embodiments, the major spatial axis d of the spot 32 is between about 1 micron and about 75 microns, or the major spatial axis d of the spot 32 is shorter than 75 microns. In some embodiments, the major spatial axis d of the spot 32 is between about 1 micron and about 50 microns, or the major spatial axis d of the spot 32 is shorter than 50 microns. (A major spatial axis d smaller than about 43.75 microns is invisible to the human eye at a distance of 12.5 cm.) In some embodiments, the major spatial axis d of the spot 32 is between about 1 micron and about 25 microns, or the major spatial axis d of the spot 32 is shorter than 25 microns. (A major spatial axis d smaller than about 22 microns is invisible to the human eye at a distance of 6.25 cm. Generally, a spot size of about 30 microns or less will be invisible to most human eyes at any distance due to the anatomical constraints of the human eye and the optical constraints of conventional eyewear.) In some embodiments, the major spatial axis d of the spot 32 is between about 1 micron and about 10 microns, or the major spatial axis d of the spot 32 is shorter than 10 microns. In some embodiments, the major spatial axis d of the spot 32 is between about 1.5 micron and about 5 microns, or the major spatial axis d of the spot 32 is shorter than 5 microns.

In general, it is advantageous to make the major spatial axis d of the spot 32 to be as small as practical (and at least small enough so as to not adversely affect the substrate to be marked) without significantly increasing the cost of the laser micromachining system or significantly increasing the cost of the optical code reader. It will be appreciated that the smaller that the major spatial axis d of the spot 32 is made, the smaller can be the minimum spot separation distance s can be made without the group 30 of spots 32 becoming visible (and the smaller the size of the overall 2DID code can be made). However, it will also be appreciated that there may be advantages for spacing the spots 32 at separation distances that are significantly greater than the minimum separation distance s to increase the signal-to-noise ratio even when the major spatial axis d of the spots 32 is minimized.

For simplicity, each spot 32 can be similar in shape, size, and spatial energy profile; however, these characteristics can be intentionally changed for particular spots 32 if desirable. Moreover, unintentional differences in the characteristics between different spots 32 do not cause optical reading errors because of the advantageous signal-to-noise ratio.

In some embodiments, based on a spot size of about 1 micron and applicant's empirical data, the minimum separation distance s is greater than or equal to 4 microns. In an exemplary array for a 177 by 177 2DID code to be marked in a 1 mm by 1 mm field, the separation distance s between 1-micron spots 32 could be as much as about 5.6 microns. Of course, the field for the modified 2DID codes need not be this small, so the largest separation distance s can be determined by the size of the substrate divided by the number of geometric areas in a row or column of the 2DID code. For example, a 10 cm by 10 cm field for a 177 by 177 2DID code could offer as much as a 565 micron-separation distance s between 1-micron spots 32; a 20 cm by 20 cm field for a 57 by 57 2DID code could offer as much as about a 3500 micron-separation distance s between 1-micron spots 32; or a 1 mm by 1 mm field for a 21 by 21 2DID code could offer as much as about a 40 micron-separation distance s between 25-micron spots 32. As noted earlier, larger separation distances s provide larger signal-to-noise ratios. Moreover, properties of the laser micromachining system may influence selection of the separation distance s between spots 32. For example, if a laser micromachining system has a spot location position accuracy of about plus or minus 20 microns, then a separation distance s of at 40 microns may be advantageous.

Figure 2:
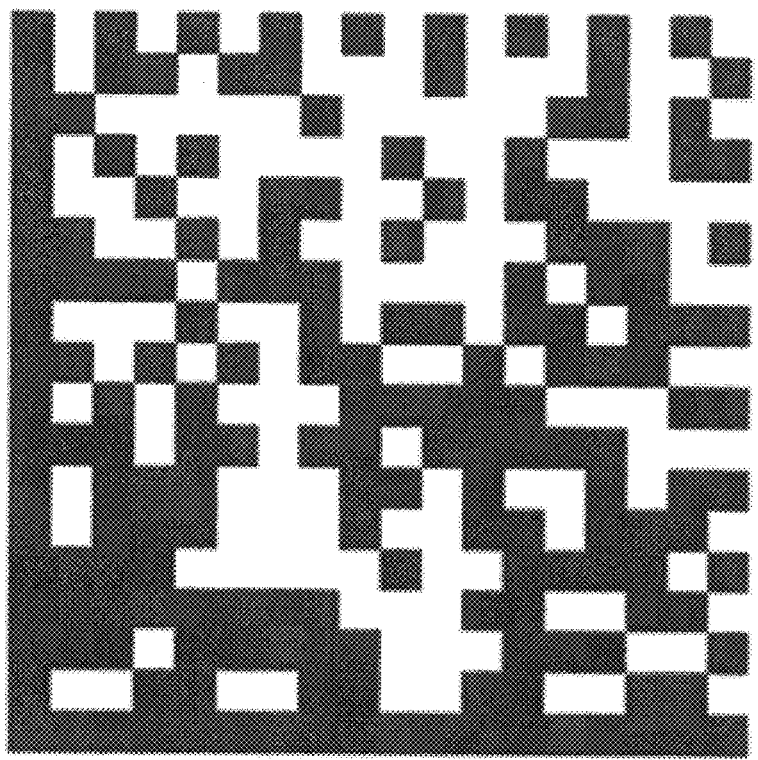
FIG. 2 is an example of a conventional Data Matrix code.
Figure 5:
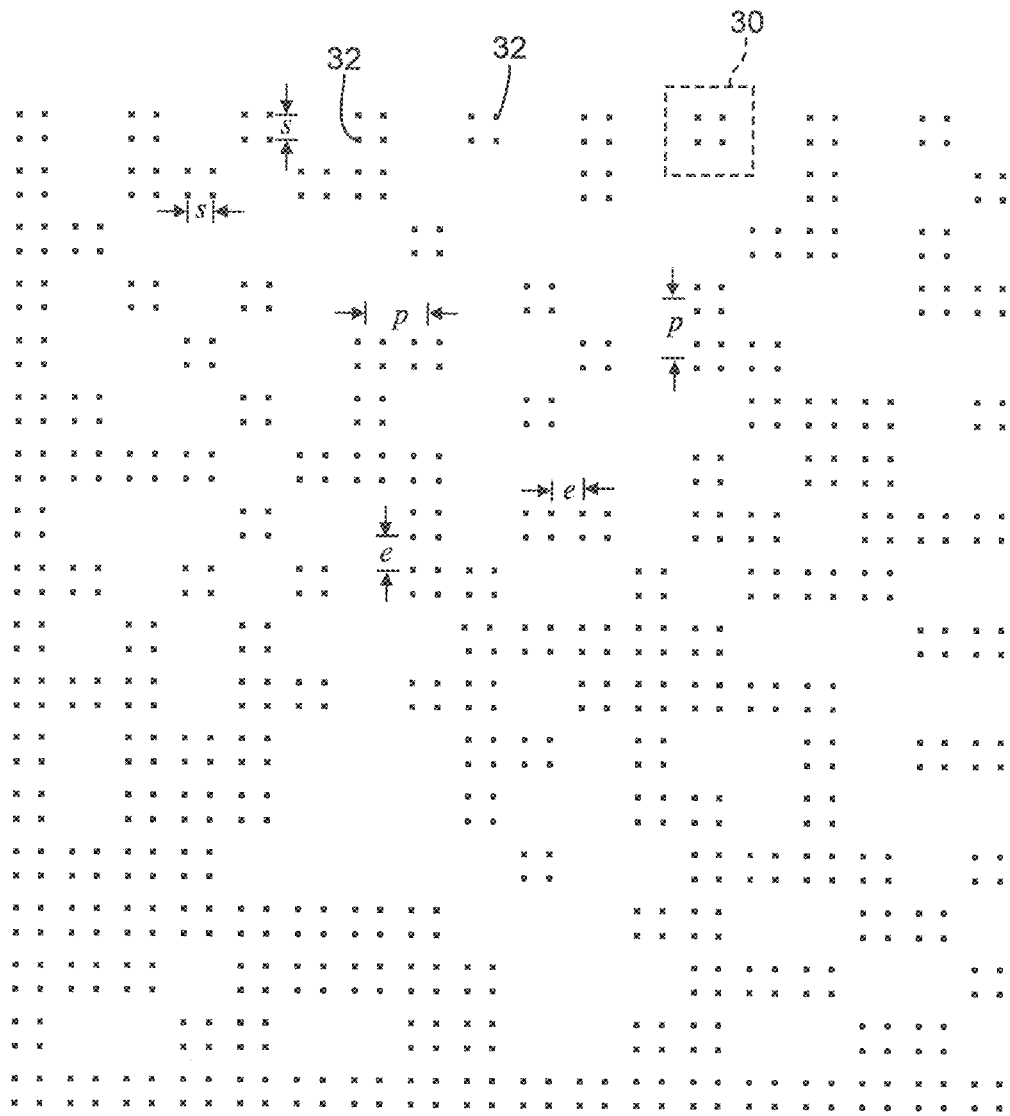
FIG. 5 is a modified version of the Data Matrix code of FIG. 2, wherein each filled darkened square is replaced with the pattern of spots of FIG. 4.

FIG. 5 is a modified version of the Data Matrix code of FIG. 2, wherein each black (designated) square in the array is replaced with the pattern of spots 32 of FIG. 4. The group 30 of spots 32 is shown having four spots 32 arranged in a pattern such that each spot 32 is positioned in proximity to or at a corner of a designated square.

The field size for the modified 2DID code array is limited only by the size of the substrate on the work piece to be marked. In many embodiments, the field will be smaller than 20 cm by 20 cm and larger than 100 microns by 100 microns. In some embodiments, the size of the modified 2DID code will be greater than or equal to 600 microns by 600 microns. In some embodiments, the size of the modified 2DID code will be smaller than or equal to 1 mm by 1 mm. In some embodiments, the size of the modified 2DID code will be larger than or equal to 1 mm by 1 mm and smaller than or equal to 10 mm by 10 mm. In some embodiments, the size of the modified 2DID code will be larger than or equal to 1 cm by 1 cm and smaller than or equal to 10 cm by 10 cm. As previously mentioned, properties of the selected laser micromachining may influence spot size and limit positioning field. Properties of the substrate may also influence field size of the array because there may be structural integrity or advantages for maximizing the separation distance s in some materials. Additionally, size and cost of optical code readers and their capabilities, and throughput of code detection may also be factors in determining an appropriate filed size for the 2DID code array. Finally, the purpose of the modified 2DID code may influence the field size selected for its array.

It will be appreciated, that the geometric areas in the array need not be square. For example, they may be triangular or hexagonal. Moreover, the number of spots 32, and the pattern of spots 32, in a group 30 representing each geometric area can somewhat arbitrary or can be particularly selected. For example, five spots can represent each designated geometric area, such a square, wherein four spots 32 are positioned at the corners and one spot 32 is positioned in the middle. Thus, each designated geometric area can be represented by an even number of spots or by an odd number of spots. In such embodiment, four of the spots 32 are separated from the middle spot 32 by the selected distance s, because it is the shortest distance between any two spots 32 in the group 30. The corner (or perimeter) spots are, therefore, separated by a distance greater than s. Thus, the spots 32 (or nearest neighboring spots 32) in a group 30 can be separated by unequal distances.

As noted previously, the designated geometric areas in the array need not be represented by a geometric pattern that is analogous to the geometric area. For example, a designated square geometric area can be represented by other geometric patterns, including but not limited to, rectangular patterns, circular patterns, hexagonal patterns, octagonal patterns, or triangular patterns. For convenience and simplicity, each designated geometric area may be provided with the same geometric pattern of spots 32. However, selected designated geometric areas may be labeled with a different number of spots 32, a different size of the pattern of spots 32, or a different pattern of spots. For example, position squares and/or alignment squares of a QR code may be represented by different patterns or by patterns of different sizes.

Figure 5A:
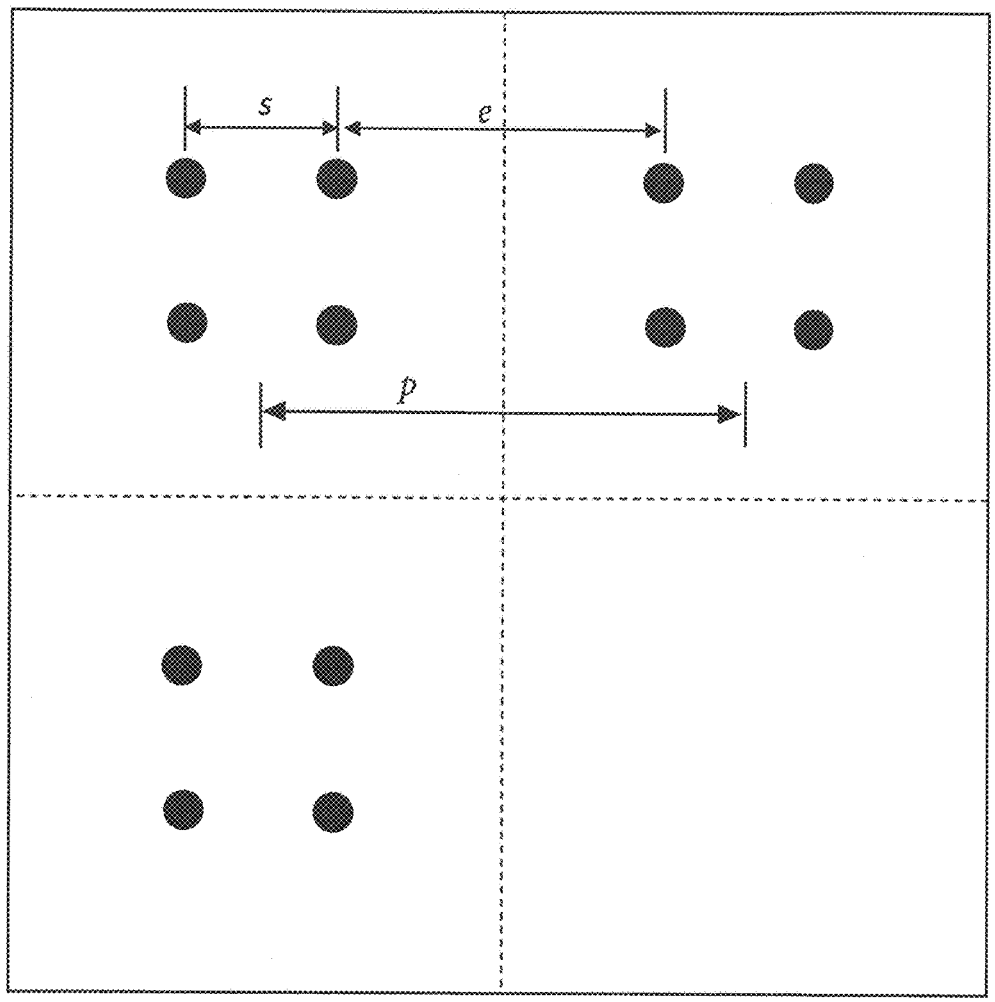
FIG. 5A is an enlarged portion of FIG. 5 to facilitate differentiation between the internal separation distance, the external separation distance, and the pitch.

With reference to FIG. 3, there is no intentional separation between adjacent marked squares, and the pitch between the marked squares has the same dimension as the sides of the marked squares. Thus, in the embodiment shown in FIG. 3, the noise can be comparable to the signal. However, with reference again to FIG. 5, in many embodiments, neighboring groups 30 of spots 32 can be separated by an external separation distance e (the minimum separation distance between adjacent spots from different groups) and a pitch p (the center-to-center spacing between adjacent geometric areas or their representative groups. FIG. 5A is an enlarged portion of FIG. 5 to facilitate differentiation between the internal separation distance s, the external separation distance e, and the pitch p.

In many embodiments, the pitch p will be different from and greater than the external separation distance e, and both the pitch p and the external separation distance e will be different from and generally greater than the selected minimum separation distance s between spots 32 in a group 30.

Moreover, in some embodiments, the external separation distance e between the rows or columns in the array can be greater than or equal to 1 s to maintain a desirable signal-to-noise ratio. One will appreciate that the external separation distance e between the rows can be different from the external separation distance e between the columns. It will also be appreciated that the external separation distance e between rows and columns may diminish the separation distances s by more than half for the earlier examples listing spot size, field size, and number of groups 30 in a row or column.

Similarly, in some embodiments, the pitch p between the rows or columns in the array can be greater than or equal to 1 s to maintain a desirable signal-to-noise ratio. One will also appreciate that the pitch p between the rows can be different from the pitch p between the columns. It will also be appreciated that the pitch p between rows and columns may diminish the separation distances s by more than half for the earlier examples listing spot size, field size, and number of groups 30 in a row or column.

Thus, the signal-to-noise ratio can also be improved by making the overall size of the geometric areas, such as squares, can be made much larger than the perimeter defined by the pattern of spots 32 (if the patterns are grouped near the center of the geometric areas).

In some embodiments, the signal amplitude can represented by the external separation distance e or the pitch p. The noise amplitude can be represented by the uncertainty or inaccuracy of the spot position with respect to a specific location on the substrate. For example, if the laser micromachining system that is marking the spots has a marking inaccuracy of +/−20 microns, this inaccuracy would represent the noise. So, the signal-to-noise ratio would be the ratio of the external separation distance e or the pitch p to the marking inaccuracy. If the marking inaccuracy inherent into a laser system is permitted to be large or gets worse over time, the external separation distance e or the pitch p could be increased to maintain an adequate signal-to-noise ratio. Alternatively, if the inaccuracy is known to be a fixed number, the signal-to-noise ratio can be increased to an arbitrarily large number by increasing the external separation distance e or the pitch p.

In view of the foregoing, the signal-to-noise ratio can easily be established to be greater than 5, which, according to the Rose criterion, is the minimum signal-to-noise ratio needed to be able to distinguish image features at 100% certainty. It will be appreciated, however, that signal-to-noise ratio values of less than 5 can be employed. Moreover, the modified two-dimensional codes described herein can provide arbitrarily large signal-to-noise ratio values, such as greater than or equal to 10, greater than or equal to 100, or greater than or equal to 1000.

In some alternative embodiments, no spacing between the rows or columns in the array is used, such that the patterns in adjacent designated geometric areas may share spots 32. For example, two corner patterns of neighboring designated square geometric areas may share the two spots 32 along the border of the two square geometric areas. The optical code reader would have to be adapted to recognize, for example, that three pairs of evenly spaced spots 32 represented two designated squares.

Regardless of the size of the array, the separation distance s between the spots 32, external separation distance e (if any) or the pitch distance p between the rows and between the columns, the selected pattern for the groups 30, and the size and shape of the geometric areas, the spots 32 can be converted back into designated geometric areas (such as black squares).

As noted previously, advantages of modifying the 2DID codes as described herein include method for making the 2DID codes invisible to the human eye in a variety of substrate materials, either transparent materials or opaque materials. Exemplary materials include ceramics, glasses, plastics, and metals, or combinations thereof. For example, laser micromachining systems can make appropriately sized marks on or within semiconductor wafer materials, such alumina or sapphire. Laser micromachining systems can also make appropriately sized marks on or within glass, strengthened glass, and Corning Gorilla Glass™. Laser micromachining systems can also make appropriately sized marks on or within polycarbonates and acrylics. Laser micromachining systems can also make appropriately sized marks on or within aluminum, steel, and titanium.

Invisible marking of modified 2DID codes not only provides a way to place codes without obscuring transparent materials, but also provides a way to hide proprietary information within the modified codes. For example, multiple patterns can be provided within a modified 2DID code, wherein only some of the patterns include the proprietary information. Additionally, the small and spread out spots 32 can be arranged to appear to be imperfections in the substrate material, so it might be difficult for a competitor or potential copier to even be aware that the modified 2DID code is present. Finally, the modified 2DID codes can be made to be more complex than standard 2DID codes, so the modified 2DID codes can be more difficult to identify and copy by a counterfeiter.

Regardless of making the 2DID codes invisible, the modified 2DID codes enable large improvements in the signal-to-noise ratio (SNR) over conventional 2DID codes by spreading of the modified code over an arbitrarily large area. Moreover, whether or not the spots 32 are invisible, the modified 2DID codes reduce error and reduce the cost and time (throughput) of error correction.

Another advantage of spreading the 2DID code over a large area enables the use of less-expensive and lower-precision laser marking systems while maintaining invisibility (if desired).

As previously noted, the spots 32 can be marked on or within the substrate material of the workpiece. For many applications, there may be advantages to marking the spots 32 internally. Invisible spots 32 are very small and may be more likely to wear, or easily be abraded off, some materials. Internal marks may, however, be less accessible to normal wear or abrasion. Internal marks also allow surfaces to retain their imperviousness with respect to dirt or fluids and may be less likely to compromise structural integrity or promote surface crack propagation or other surface defects.

In general, internal marking may include one or more of cracking, density modification, void creation, stress fields, or re-crystallizations of core material between surfaces of a substrate.

Exemplary laser pulse parameters which may be selected to improve the reliability and repeatability of laser marking of substrates include laser type, wavelength, pulse duration, pulse repletion rate, number of pulses, pulse energy, pulse temporal shape, pulse spatial shape, and focal spot size and shape. Additional laser pulse parameters include specifying the location of the focal spot relative to the surface of the article and directing the relative motion of the laser pulses with respect to the article.

Figure 6:
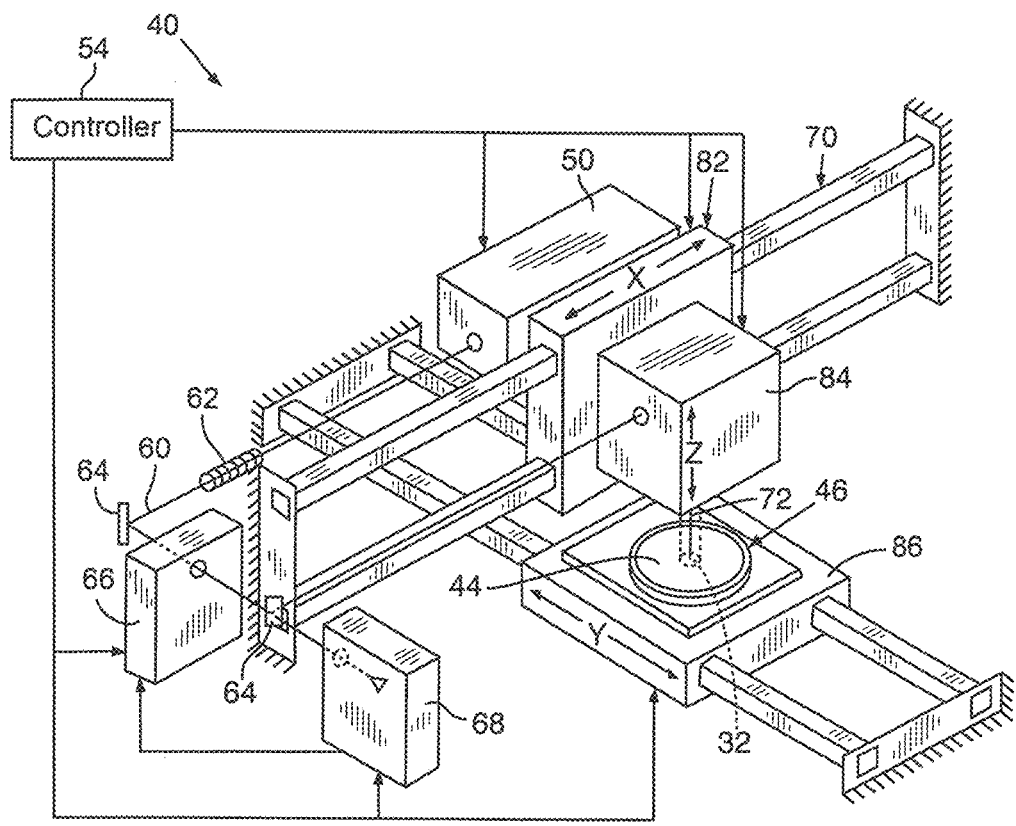
FIG. 6 is simplified and partly schematic perspective view of some components of an exemplary laser micromachining system suitable for producing the spot of a modified 2DID code.

FIG. 6 is simplified and partly schematic perspective view of some components of an exemplary laser micromachining system 40 suitable for producing the spot of a modified 2DID code. With reference to FIG. 6, some exemplary laser processing systems operable for marking spots 32 on or beneath a surface 42 of substrate 44 of a workpiece 46 are the ESI MM5330 micromachining system, the ESI ML5900 micromachining system and the ESI 5955 micromachining system, all manufactured by Electro Scientific Industries, Inc., Portland, Oreg. 97229.

These systems typically employ a solid-state diode-pumped laser, which can be configured to emit wavelengths from about 366 nm (UV) to about 1320 nm (IR) at pulse repetition rates up to 5 MHz. However, these systems system may be adapted by the substitution or addition of appropriate laser, laser optics, parts handling equipment, and control software to reliably and repeatably produce the selected spots 32 on or within substrates 44 as previously described. These modifications permit the laser processing system to direct laser pulses with the appropriate laser parameters to the desired locations on an appropriately positioned and held workpiece at the desired rate and pitch between laser spots or pulses to create the desired spot 32 with desired color, contrast, and/or optical density.

In some embodiments, the laser micromachining system 40 employs a diode-pumped Nd:YVO$_4$ solid-state laser 50 operating at 1064 nm wavelength, such as a model Rapid manufactured by Lumera Laser GmbH, Kaiserslautern, Germany. This laser can be optionally frequency doubled using a solid-state harmonic frequency generator to reduce the wavelength to 532 nm thereby creating visible (green) laser pulses, or tripled to about 355 nm or quadrupled to 266 nm thereby creating ultraviolet (UV) laser pulses. This laser 50 is rated to produce 6 Watts of continuous power and has a maximum pulse repetition rate of 1000 KHz. This laser 50 produces laser pulses 52 (FIG. 7) with duration of 1 picosecond to 1,000 nanoseconds in cooperation with controller 54.

These laser pulses 52 may be Gaussian or specially shaped or tailored by the laser optics 62, typically comprising one or more optical components positioned along an optical path 60, to permit desired characteristics of the spots 32. For example, a "top hat" spatial profile may be used which delivers a laser pulse 12 having an even dose of radiation over the entire spot 32 that impinges the substrate 44. Specially shaped spatial profiles such as this may be created using diffractive optical elements or other beam-shaping components. A detailed description of modifying the spatial irradiance profile of laser spots 32 can be found in U.S. Pat. No. 6,433,301 of Corey Dunsky et al., which is assigned to the assignee of this application, and which is incorporated herein by reference.

The laser pulses 52 are propagated along an optical path 60 that may also include fold mirrors 64, attenuators or pulse pickers (such as acousto-optic or electro-optic devices) 66, and feedback sensors (such as for energy, timing, or position) 68.

The laser optics 62 and other components along the optical path 60, in cooperation with a laser beam-positioning system 70 directed by the controller 54, direct a beam axis 72 of the laser pulse 52 propagating along the optical path 60 to form a laser focal spot 80 in proximity to the surface 42 of the substrate 44 at a laser spot position. The laser beam-positioning system 70 may include a laser stage 82 that is operable to move the laser 50 along an axis of travel, such as the X-axis, and a fast-positioner stage 84 to move a fast positioner (not shown) along an axis of travel, such as the Z-axis. A typical fast positioner employs a pair of galvanometer-controlled mirrors capable of quickly changing the direction of the beam axis 72 over a large field on the substrate 44. Such field is typically smaller than the field of movement provided by the workpiece stage 86, as later described. An acousto-optic device or a deformable mirror may also be used as the fast positioner, even though these devices tend to have smaller beam deflection ranges than galvanometer mirrors. Alternatively, an acousto-optic device or a deformable mirror may be used as a high-speed positioning device in addition to galvanometer mirrors.

Additionally, the workpiece 46 may be supported by a workpiece stage 86 having motion control elements operable to position the substrate 44 with respect to the beam axis 72. The workpiece stage 86 may be operable to travel along a single axis, such as the Y-axis, or the workpiece stage 86 may be operable to travel along transverse axes, such as the X- and Y-axes. Alternatively, the workpiece stage 86 may be operable to rotate the workpiece 44, such as about a Z-axis (solely, or as well as move the workpiece along the X- and Y-axes).

The controller 54 can coordinate operation of the laser beam-positioning system 70 and the workpiece stage 86 to provide compound beam-positioning capability, which facilitates the capability to mark spots 32 on or within the substrate 42 while the workpiece 44 can be in continuous relative motion to the beam axis 72. This capability is not necessary for marking the spots 32 on the substrate 42, but this capability may be desirable for increased throughput. This capability is described in U.S. Pat. No. 5,751,585 of Donald R. Cutler et al., which is assigned to the assignee of this application, and which is incorporated herein by reference. Additional or alternative methods of beam positioning can be employed. Some additional or alternative methods of beam positioning are described in U.S. Pat. No. 6,706,999 of Spencer Barrett et al. and U.S. Pat. No. 7,019,891 of Jay Johnson, both of which are assigned to the assignee of this application, and which are incorporated herein by reference.

The various beam-positioning systems described herein can be controlled to offer beam-positioning accuracy of laser spot position within a few microns of the desired location of a spot 32 on the substrate 44. It is noted, however, that high accuracy may be implemented with higher cost components, greater feedback control, and slower system throughput. In general, beam-positioning error can be as large as one-half the separation distance s due to the significantly increased signal-to-noise ratio afforded by the modified 2DID codes described herein. This allowable error can be quite large, such as a 1 mm for vary large fields. However, even very low-cost laser micromachining systems can achieve greater accuracy. Applicant has determined that for many embodiments, the error of laser spot position can be as much as plus or minus 20 microns of the desired location of a spot 32 on the substrate 44 even for relatively small fields. For many embodiments with very small fields, the error of laser spot position can be as much as plus or minus 10 microns of the desired location of a spot 32 on the substrate 44. However, for minimized field sizes, the error of laser spot position can be as much as plus or minus 1 micron of the desired location of a spot 32 on the substrate 44.

The cost for a +/−0.5 micron accuracy laser micromachining system used to produce a 126×126 micron demonstration can be well over a million dollars. The cost for a +/−20 micron accuracy laser micromachining system can be approximately one-tenth the cost of the more accurate machine (i.e., around $100,000). Moreover, Other the more accurate machines are much larger and require a carefully controlled temperature environment (and controlled vibration), whereas a +/−20 micron accuracy machine is significantly smaller and can work in a typical factory environment without special constraints.

Figure 7:
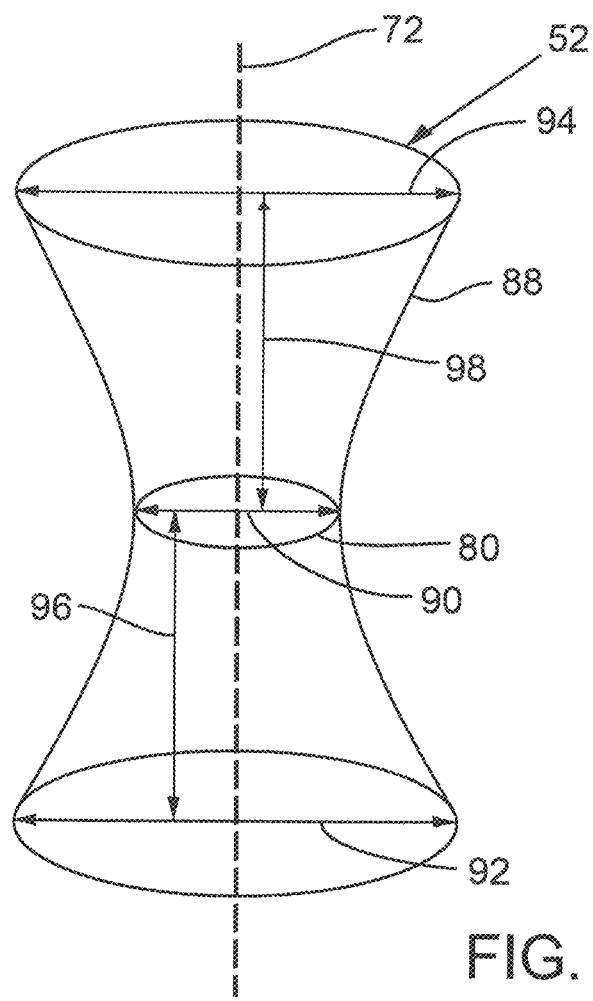
FIG. 7 shows a diagram of a laser pulse focal spot and its beam waist.

FIG. 7 shows a diagram of the focal spot 80 and its beam waist 90. With reference to FIG. 7, the focal spot 80 of the laser pulse 52 will have a beam waist 90 (cross-section) and laser energy distribution that are largely determined by the laser optics 62. The major spatial axis d of the spot 32 is typically a function of the major axis of the beam waist, and the two may be the same or similar. However, the major spatial axis d of the spot 32 may be larger than or smaller than the major axis of the beam waist.

The laser optics 62 can be used to control the depth of focus of the beam waist and hence the depth of the spot 32 on within the substrate 44. By controlling the depth of focus, the controller 54 can direct the laser optics 62 and the fast positioner Z-stage 84 to position the spot 32 either at or near the surface of the substrate 44 repeatably with high precision. Making marks by positioning the focal spot above or below the surface 42 of the substrate 44 allows the laser beam to defocus by a specified amount and thereby increase the area illuminated by the laser pulse and decrease the laser fluence at the surface 42 (to an amount that is less than the damage threshold of the material at the surface). Since the geometry of the beam waist is known, precisely positioning the focal spot 80 above or below or within the actual surface 42 of the substrate will provide additional precision control over the major spatial axis d and the fluence.

In some embodiments, such as for marking transparent materials such as sapphire, the laser fluence can be precisely controlled at the core of the substrate 44 by adjusting the location of the laser spot from being on the surface 42 of the substrate 44 to being located a precise distance within the substrate 44. With reference again to FIG. 7, the beam waist 90 is represented as a spatial energy distribution 88 of a laser pulse 52 along the beam axis 72 as measured by the FWHM method. The major axis 92 represents the laser pulse spot size on the surface 42 if the laser micromachining system 40 focuses the laser pulse 52 at a distance 96 above the surface 42. The major axis 94 represents the laser pulse spot size on the surface 42 if the laser processing system focuses the laser pulses at a distance 98 below the surface. For most embodiments where internal marking of the spots 32 is desirable, the focal spot 80 is directed to be positioned within the substrate 44 rather than above or below its surface 42. The fluence or irradiance may be employed at an amount that is lower than the ablation threshold of the substrate material except at the focal spot 80, at which the fluence or irradiance is concentrated to be above the ablation threshold of the substrate material.

Laser parameters that may be advantageously employed for some embodiments include using lasers 50 with wavelengths that range from IR through UV, or more particularly from about 10.6 microns down to about 266 nm. The laser 50 may operate at 2 W, being in the range of 1 W to 100 W, or more preferably 1 W to 12 W. Pulse durations range from 1 picosecond to 1000 ns, or more preferably from about 1 picosecond to 200 ns. The laser repetition rate may be in a range from 1 KHz to 100 MHz, or more preferably from 10 KHz to 1 MHz. Laser fluence may range from about $0.1 \times 10^{-6}$ J/cm$^2$ to 100.0 J/cm$^2$ or more particularly from $1.0 \times 10^{-2}$ J/cm$^2$ to 10.0 J/cm$^2$. The speed with which the beam axis 72 moves with respect to the substrate 44 being marked ranges from 1 mm/s to 10 m/s, or more preferably from 100 mm/s to 1 m/s. The pitch or spacing between adjacent rows of spots 32 on the substrate 44 may range from 1 micron to 1000 microns or more preferably from 10 microns to 100 microns. The major spatial axis d of the laser pulses 52 measured at the surface 42 of the substrate 44 may range from 10 microns to 1000 microns or from 50 microns to 500 microns. Of course, the major spatial axis d is preferably smaller than about 50 microns if the spot 32 is intended to be invisible. The elevation of the focal spot 80 of the laser pulses 52 with respect to the surface 42 of the substrate 44 may range from −10 mm to +10 mm or from −5 mm to +5 mm. In many embodiments for surface marking, the focal spot 80 is positioned at the surface 42 of the substrate 44. For many embodiments of internal marking, the focal spot 80 is positioned beneath the surface 42 of the substrate 44 (between the surfaces of the substrate). For some embodiments of internal marking, the focal spot 80 is positioned at least 10 microns beneath the surface 42 of the substrate 44. For some embodiments of internal marking, the focal spot 80 is positioned at least 50 microns beneath the surface 42 of the substrate 44. For some embodiments of internal marking, the focal spot 80 is positioned at least 100 microns beneath the surface 42 of the substrate 44.

Applicant discovered that use of a subsurface focal spot 80 in combination with the use of picosecond lasers, which produce laser pulsewidths in the range from 1 to 1,000 picoseconds, provided a good way to reliably and repeatably create marks within some transparent semiconductor substrates, such as sapphire. In some embodiments, pulsewidths in a range from 1 to 100 ps can be employed. In some embodiments, pulsewidths in a range from 5 to 75 ps can be employed. In some embodiments, pulsewidths in a range from 10 to 50 ps can be employed. It is speculated that femtosecond laser, producing wavelengths in the 10- to 1000-femtosecond range, could alternatively provide good results. An advantage of using picosecond lasers, however, is that they are much less expensive, require much less maintenance, and typically have much longer operating lifetimes than existing femtosecond lasers.

Although marking can be accomplished at a variety of wavelengths as previously discussed, applicant found that IR lasers operating in the picosecond ranges provide particularly repeatable good results. Wavelengths at or near 1064 nm were particularly advantageous. An exemplary laser 50 was a Lumera 6 W laser. It will be appreciated that fiber lasers or other types of lasers could be employed.

Similar parameters can also be used to make invisible subsurface marks in metals or coated metals, such as anodized aluminum. Tailoring marking for anodized aluminum substrates 44 is described in detail in U.S. Pat. No. 8,379,679 and U.S. Pat. Pub. No. 2013-0208074, both of Haibin Zhang et al., both of which are assigned to the assignee of this application, and both of which are incorporated herein by reference.

As previously discussed, transparent semiconductor substrate materials can be marked internally by selectively directing laser output at the substrate material. Internal marking of the substrate 44 retains the integrity of the surface 42, such as its water and dirt resistance. Internal marking also reduces crack propagation and other adverse effects created by surface marking.

Figure 8:
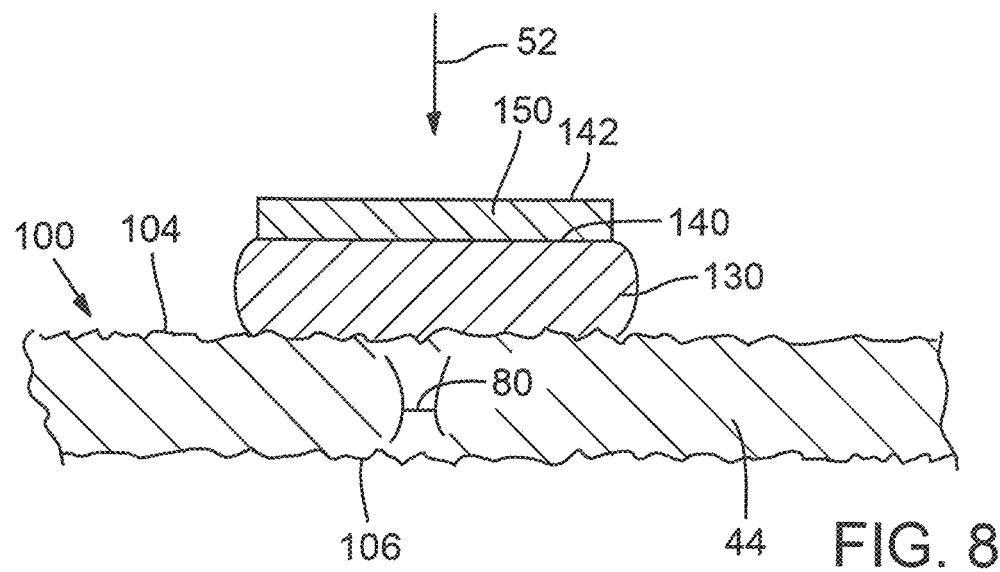
FIG. 8 is a cross sectional side view of a sapphire wafer having a rough surface covered by a coating material and a cover.

With reference to FIG. 8, applicant has also noted that wafers 100 or other semiconductor substrate materials cut from ingots tend to have rough surfaces 104 and 106. The surface texture of these rough surfaces 104 and 106 in their native states can adversely affect optical properties of the laser pulses 52 directed at the substrate 100.

Applicant has also determined that substrates 100 having a rough surface 104 or 106, such as an unpolished surface, can be difficult to mark internally without causing damage to the surface 104 or 106.

The adverse optical effects of the rough surfaces can be mitigated by employing a coating material 130 that effectively provides a flat surface 140 or 142 to receive the laser output 110. The flat surface 140 represents the upper surface of the coating material 130. The flat surface 142 is the flat surface of a cover 150 for the coating material 130. The coating material 130 has a coating refractive index that is optically compatible with the substrate refractive index.

The coating refractive index may be within 2 of the refractive index of the substrate refractive index (such as at 25 degrees Celsius). The coating refractive index may be within 1 of the refractive index of the substrate refractive index. The coating refractive index may be within 0.5 of the refractive index of the substrate refractive index. The coating refractive index may be within 0.2 of the refractive index of the substrate refractive index. The coating refractive index may be between 1.2 and 2.5. The coating refractive index may be between 1.5 and 2.2. The coating refractive index may be between 1.7 and 2.0. The coating refractive index may be between 1.75 and 1.85. The cover may also have matching refractive indices in these ranges.

The coating material may comprise a fluid, a gel, or an oil. The coating material may have a boiling point that is greater than 180 degrees Celsius (such as at 760 mm Hg). The coating material may have a density of between 2 and 5 g/cc (such as at 25 degrees Celsius). The coating material may have a density of between 2.5 and 4 g/cc. The coating material may have a density of between 3 and 3.5 g/cc.

In some embodiments, the coating material may comprise methylene iodide. The coating material may comprise a gem refractometer liquid. The coating material can maintain fluidic properties during laser processing. The coating material may comprise a leveling composition. The coating material is preferably easy to remove from the rough surface after laser processing. The coating material can be cleaned from the rough surface by acetone, carbon tetrachloride, ethyl ether, methylene chloride, toluene, xylene, or a combination thereof, or the coating material can be cleaned from the rough surface by water, or the coating material can be cleaned from the rough surface by alcohol.

The cover may be transparent to the laser wavelength. The cover may comprise the substrate material. The cover may comprise a smooth cover surface that is nonreflective at the wavelength. The cover may comprise a glass. The cover may comprise a sapphire, diamond, silicon, or plastic.

These rough surface mitigation techniques are described in U.S. Prov. Pat. Appl. No. 61/912,192 of Haibin Zhang et al., which is incorporated herein by reference.

Although the foregoing description has been made herein by way of example to 2DID codes, skilled persons can appreciate that by utilizing depth control for marking transparent substrates 44, 3D codes employing spots 32 can be constructed.

The foregoing is illustrative of embodiments of the invention and is not to be construed as limiting thereof. Although a few specific example embodiments have been described, those skilled in the art will readily appreciate that many modifications to the disclosed exemplary embodiments, as well as other embodiments, are possible without materially departing from the novel teachings and advantages of the invention.

Accordingly, all such modifications are intended to be included within the scope of the invention as defined in the claims. For example, skilled persons will appreciate that the subject matter of any sentence or paragraph can be combined with subject matter of some or all of the other sentences or paragraphs, except where such combinations are mutually exclusive.

It will be obvious to those having skill in the art that many changes may be made to the details of the above-described embodiments without departing from the underlying principles of the invention. The scope of the present invention should, therefore, be determined by the following claims, with equivalents of the claims to be included therein.

The invention claimed is:

1. A method for marking a substrate with a two-dimensional identification code represented by an array of designated and undesignated geometric areas, comprising:
generating laser pulses; and
directing the laser pulses at the substrate to form a distribution of spots on or within the substrate, wherein the distribution of spots represents the two-dimensional code and comprises multiple groups of spots, including first and second groups that each include multiple spaced-apart spots, wherein each of the first and second groups of spots is representative of a designated geometric shape, such that the distribution of spots forms an array of multiple rows and columns of geometric areas, wherein some of the geometric areas include one group of spots and some of the geometric areas are devoid of spots such that the geometric areas that include one group of spots represent the designated geometric areas and such that the geometric areas that are devoid of spots represent the undesignated geometric areas.

2. The method of claim 1, wherein the designated geometric shape is a rectangular geometric shape, and wherein the first and second groups of spots are positioned to represent corners of the rectangular geometric shape.

3. The method of claim 1, wherein the first and second groups of spots each contain an odd number of spots.

4. The method of claim 1, wherein the distribution of spots representing the two-dimensional code is invisible to a human eye at a distance of greater than or equal to 25 mm from the human eye.

5. The method of claim 1, wherein the array has an array dimension that is larger than 50 microns.

6. The method of claim 1, wherein the array has an array dimension that is larger than 500 microns.

7. The method of claim 1, wherein the array has an array dimension that is smaller than or equal to 1 mm.

8. The method of claim 1, wherein the first and second groups of spots are invisible to the human eye at a distance of greater than or equal to 25 mm from the human eye.

9. The method of claim 8, wherein the array presents a pitch between groups that is in a range of 10 to 100 microns.

10. The method of claim 8, wherein the array is greater than or equal to 600 microns by 600 microns.

11. The method of claim 1, wherein each spot of the first and second groups is invisible to the human eye at a distance of greater than or equal to 25 mm from the human eye.

12. The method of claim 11, wherein the spots of each of the first and second groups are spaced-apart, wherein each of the first and second groups of spots is representative of a filled-in designated geometric shape, wherein the geometric areas that include one group of spots designate one of a light geometric area or a darkened geometric area, wherein the geometric areas that are devoid of spots designate one of the light geometric area or the darkened geometric area, and wherein the geometric areas that include one group of spots and the geometric areas that are devoid of spots designate different ones of the light and dark geometric areas.

13. The method of claim 11, wherein each of the first and second groups contains less than or equal to five spaced-apart spots.

14. The method of claim 1, wherein the spots of the first and second groups each have a dimension for a major spatial axis that is smaller than 35 microns.

15. The method of claim 14, wherein the spots each have a dimension for a major spatial axis, and wherein the spots are separated by a distance that is greater than or equal to four times the dimension of the major spatial axis.

16. The method of claim 15, wherein the pattern of spots provides a signal to noise ratio of greater than or equal to 5.

17. The method of claim 1, wherein the spots each have a dimension for a major spatial axis, and wherein the spots are separated by a distance that is greater than or equal to four times the dimension of the major spatial axis.

18. The method of claim 1, wherein the geometric areas represent squares in a QR code.

19. The method of claim 1, wherein each spot is formed by a single laser pulse having a pulsewidth that is shorter than 50 ps.

20. The method of claim 1, wherein the spots are dark and the substrate is light.

21. The method of claim 1, wherein the spots are dark, and wherein the substrate is substantially transparent to visible light.

22. The method of claim 1, wherein the substrate comprises a glass, a metal, or a plastic.

23. The method of claim 1, wherein the substrate comprises sapphire or anodized aluminum.

24. The method of claim 1, wherein a beam-positioning system and a substrate support system cooperate to position the spots of the laser pulses with respect to locations on the substrate, and wherein positioning accuracy of some spots to location is worse than 10 microns.

25. The method of claim 1, wherein the group of spots provides a signal to noise ratio of greater than or equal to 5.

26. The method of claim 25, wherein a beam-positioning system and a substrate support system cooperate to position the spots of the laser pulses with respect to locations on the substrate, and wherein positioning accuracy of some spots to location is worse than 10 microns.

27. The method of claim 26, wherein each spot of the first and second groups is invisible to the human eye at a distance of greater than or equal to 25 mm from the human eye.

28. The method of claim 1, wherein the array comprises at least 50 geometric areas in a row or a column.

29. A laser micromachining system for marking a substrate with a two-dimensional identification code on or within a substrate of a workpiece, wherein the two-dimensional code includes an array of geometrically-shaped areas, wherein some the geometrically-shaped areas are designated and some of the geometrically-shaped areas are undesignated, the laser micromachining system comprising:
a laser for generating laser pulses along a beam axis;
a workpiece support system for moving the workpiece;
a beam-positioning system for directing the beam axis toward the workpiece, such that one or more laser pulses are operable to mark a spot on the substrate; and
a controller for coordinating relative movement of the workpiece support system and the beam-positioning system, and for implementing conversion of each designated geometrically-shaped area of the two-dimensional code into prospective locations on the substrate for laser pulses to form a pattern of multiple spaced-apart spots representative of the designated geometrically-shaped area.

30. The laser micromachining system of claim 29, wherein the beam-positioning system and the substrate support system cooperate to position the spots of the laser pulses with respect to locations on the substrate, and wherein positioning accuracy of some spots to location is worse than 10 microns.

31. The laser micromachining system of claim 30, wherein the pattern of spots provides a signal to noise ratio of greater than or equal to 5.

32. A two-dimensional identification code represented by an array of designated and undesignated geometric areas, comprising:
a distribution of spots on or within a substrate having a contrasting background, wherein the distribution of spots comprises multiple groups of spots, including first and second groups that each include multiple spaced-apart spots arranged in a discernable pattern, wherein each of the first and second groups of spots is representative of a designated geometric shape, such that the distribution of spots forms an array of multiple rows and columns of geometric areas, wherein some of the geometric areas include one group of spots and some of the geometric areas are devoid of spots such that the geometric areas that include one group of spots represent the designated geometric areas and such that the geometric areas that are devoid of spots represent the undesignated geometric areas.

33. The two-dimensional identification code of claim 32, wherein the pattern of spots provides a signal to noise ratio of greater than or equal to 5.

34. The two-dimensional identification code of claim 33, wherein the spots of the first and second groups each have a dimension for a major spatial axis that is smaller than 35 microns.

35. The two-dimensional identification code of claim 34, wherein the spots each have a dimension for a major spatial axis, and wherein the spots in the groups are separated by a distance that is greater than or equal to four times the dimension of the major spatial axis.

36. The two-dimensional identification code of claim 35, wherein the geometric areas represent squares in a QR code.

* * * * *